(No Model.) 3 Sheets—Sheet 3.
F. J. H. HAZARD.
PNEUMATIC CASH CARRIER APPARATUS.
No. 530,772. Patented Dec. 11, 1894.
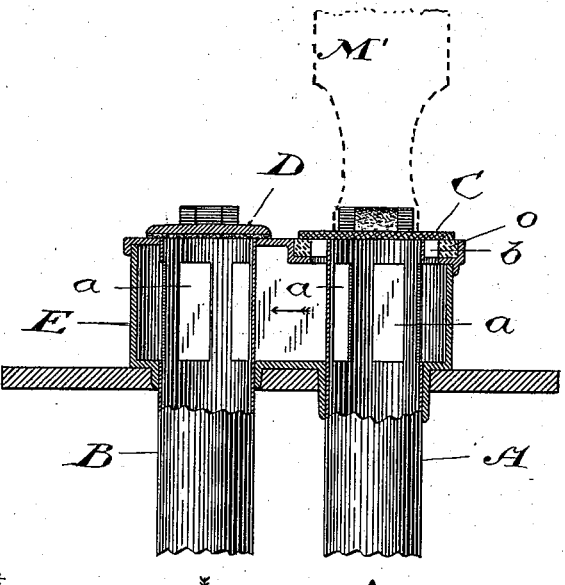
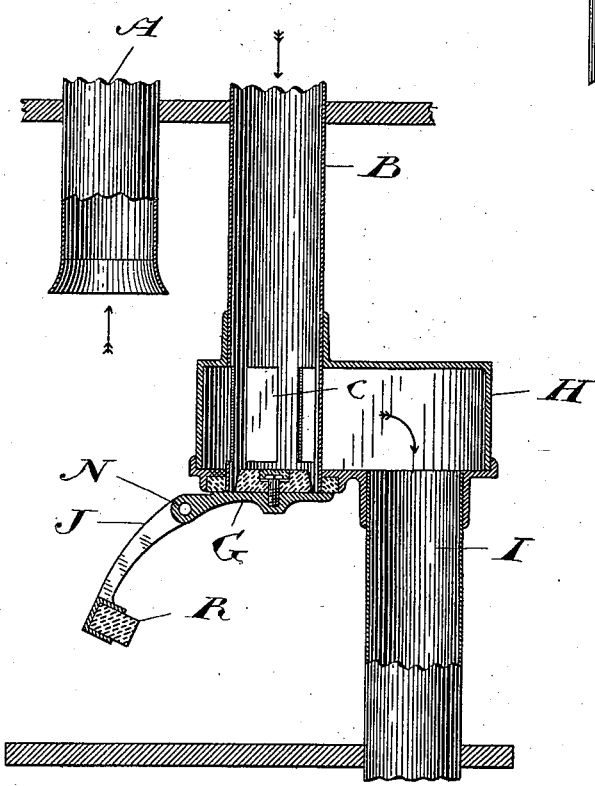
Witnesses
Fred Clarke
A. M. Neff.
Inventor
F. J. H. Hazard
by Ridout & Maybee
Attys

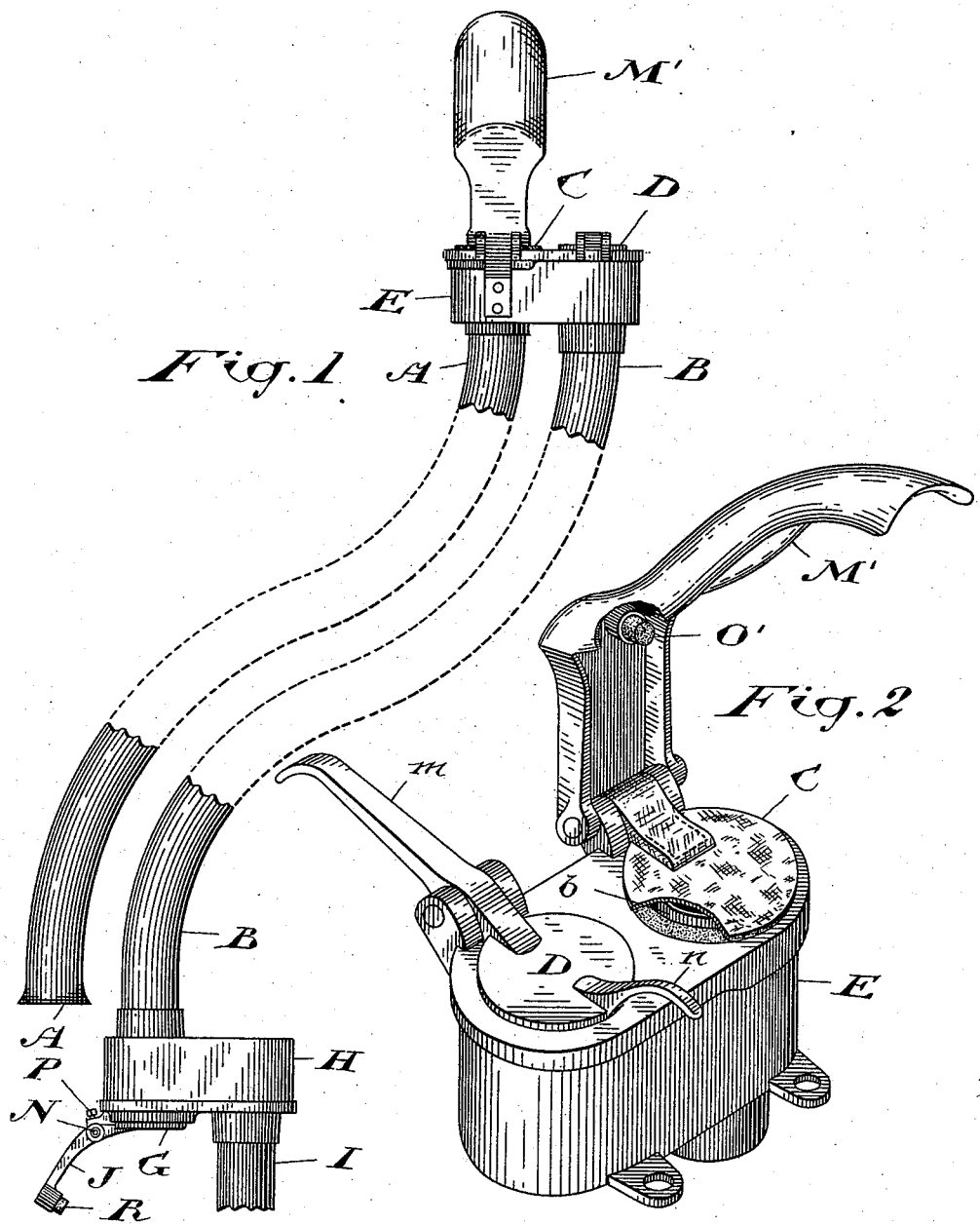

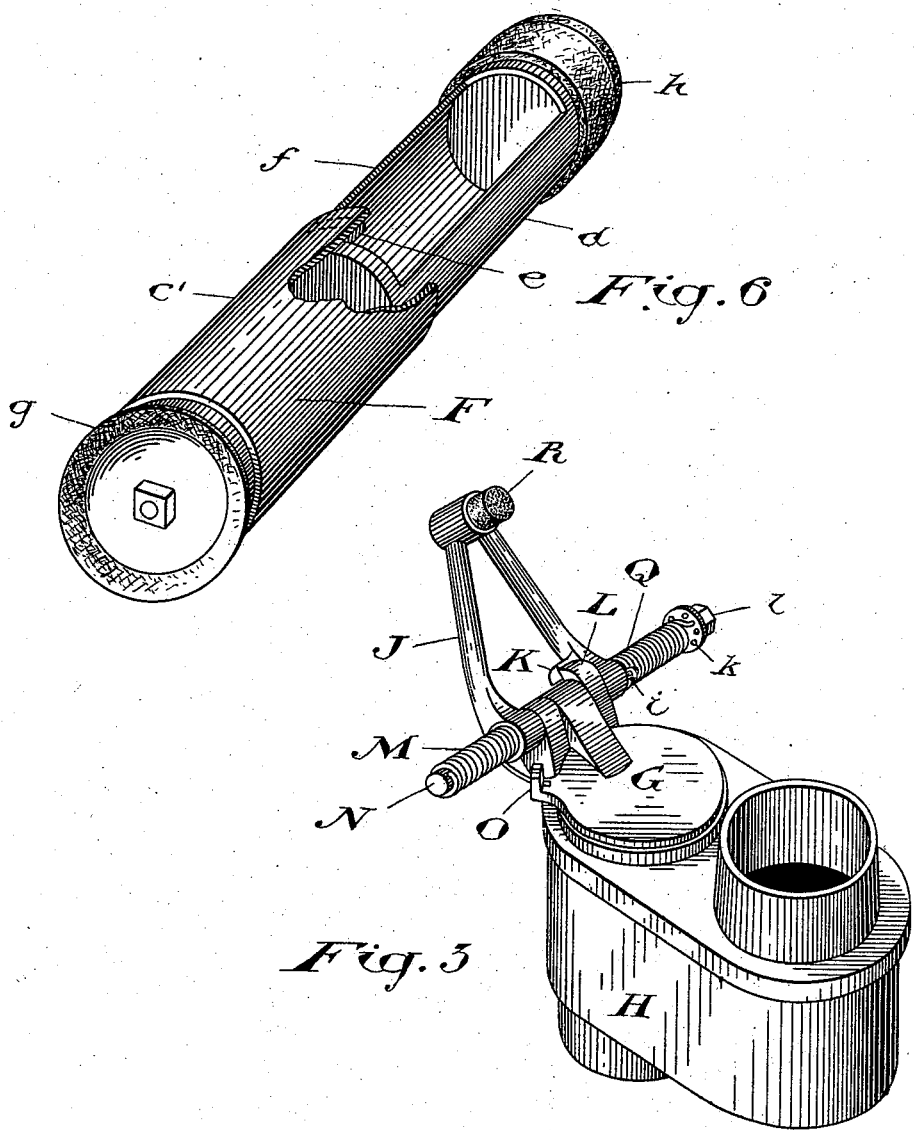

UNITED STATES PATENT OFFICE.

FREDERICK JAMES HAWORTH HAZARD, OF TORONTO, CANADA.

PNEUMATIC CASH-CARRIER APPARATUS.

SPECIFICATION forming part of Letters Patent No. 530,772, dated December 11, 1894.

Application filed January 15, 1894. Serial No. 496,889. (No model.)

*To all whom it may concern:*

Be it known that I, FREDERICK JAMES HAWORTH HAZARD, of the city of Toronto, in the county of York and Province of Ontario, Canada, have invented certain new and useful Improvements in Pneumatic Cash-Carrier Apparatus, of which the following is a specification.

The object of my invention is to construct a simple and effective pneumatic cash carrier apparatus which may be operated with a minimum air pressure, and it consists, essentially, in the peculiar construction, arrangement and combinations of parts hereinafter described and then definitely pointed out in the claims.

In the accompanying drawings Figure 1, is a general view of the apparatus in elevation. Fig. 2, is a perspective detail of the salesman's end of the apparatus. Fig. 3, is a perspective detail reversed, of the cashier's end of the apparatus. Fig. 4, is a sectional elevation of the same. Fig. 5, is a sectional elevation of the salesman's end of the apparatus. Fig. 6, is a perspective detail of the leather carrier open to receive the cash.

In the drawings, like letters of reference indicate corresponding parts in the different figures.

A, is the up tube into which the carrier is inserted through the bell mouth at its lower end. This tube extends upward and passes through the chamber E, at the salesman's end where it is closed by the pivoted leather trap C. The down tube B, also passes through this chamber and is closed at its upper end by the trap D. Large openings $a$, are made through the portions of the tubes inside the chamber E. These openings are made very large so that practically only sufficient of the tube is left to serve as a guide for the carrier when being discharged from or inserted into the apparatus. An annular opening $b$, is left around the end of the tube A, so as to form, when the trap C, is raised, a direct communication between the chamber E, and the outer air. (See Figs. 2 and 5.)

The down pipe B, terminates at the lower side of the chamber H, at the cashier's end, and is closed by the trap G, which is normally held closed by the coiled spring M, one end of which is fast to the spindle N, while the other bears on the lug O, formed on the trap G. (See Fig. 3.)

The spindle N, is clamped in its bearings by the set screw P, (see Fig. 1) and is extended on the other side to support the coil-spring Q, one end of which is connected with a pin $i$, on the stop J, while the other end is inserted into one of the holes $k$, formed in the nut $l$, screwed on the end of the spindle N. By inserting the end of the spring in different holes in the nut $l$, before connecting the spring with the pin $i$, any desired tension may be given to the stop J, which is provided with a rubber buffer R, to receive the impact of the trap G.

A lug K, formed on the stop J, engages with the stop L, formed on the bearings of the spindle N, and limits the forward motion of the stop J.

I, is the suction pipe communicating with the chamber H, which communicates with the tube B, by large openings $c$, similar to the openings $a$. (See Fig. 4.)

In Fig. 6, the carrier is illustrated. This is composed of an outer case $c'$, having a stop $e$, connected to it near its open end. An inner case $d$, is inserted in the case $c'$, and has an opening $f$, formed therein for the admission of the cash or other contents of the carrier. The stop $e$, engaging with the end of the opening F, prevents the inner case being separated from the outer. The friction of the two cases is sufficient to hold the inner case in place when it is pushed into the outer.

To one end of the carrier a buffer $h$, is connected, and to the other a flexible ring or washer $g$, which enables the carrier to fit the tubes accurately under air pressure even though slight variations occur in the diameter of the same.

Having thus set out the construction of my apparatus, I will briefly describe its operation.

The carrier F, is inserted in the bell-mouth of the tube A, and is drawn through the said tube and against the trap C, by the suction of the air which passes through the apparatus in the direction indicated by the arrows, the suction pipe I, being connected to any suitable exhaust apparatus. (See Figs. 1, 4 and 5.) When the carrier strikes the trap C, it elevates it and passes on and out striking the curved hood M', located above the said trap and being deflected thereby so as to fall onto the counter or place of delivery. A buffer O', is connected to the hood to receive the blow of the trap as it is forced back. When the carrier arrives at the end of the tube, the openings, $a$, are of course closed and as the trap is opened, the pressure of the air will tend to retard or prevent the exit of the carrier. It is to obviate this difficulty that the opening $b$, is provided, so that when the trap C, is raised and the openings $a$, closed, the air to supply the down pipe is drawn directly into the chamber E, through the opening $b$, and so through the openings $a$, into the down pipe, thus relieving the carrier of all air pressure tending to retard its exit. When the carrier is to be sent down to the cashier, the trap D, is raised by means of the handles $m$, or $n$, and the carrier inserted. Upon the trap being closed, the carrier is drawn down the pipe B, till it strikes the trap G, which it opens, falling out on the cashier's desk. The trap G, is driven back by the force of the blow till it comes into contact with the stop J, which gradually stops its motion without injury to the trap, and the spring M, returns the trap to its normal position when the carrier has passed.

In Fig. 4, a pad is shown connected to the inner side of the trap G, but this is not an essential feature.

There are in my device five features which co-operate toward the end desired which is to permit of the use of a very low air pressure resulting in great economy of working. The first is the location of the exit traps immediately at the ends of their respective pipes and operating them by the direct blow of the carrier, the full impetus of which is thus available for opening the said traps. The second is the use of the large chamber E, and openings $a$, in the tubes which permits of the free passage of the air from one tube to the other without the friction resulting from connections ordinarily in use. The third is the construction of the carrier, which is formed of leather or other suitable light and tough material. This reduction in weight of the carrier is very important, as it not only admits of a direct saving in air pressure, but also permits of the carrier being allowed to strike the traps with its full impetus, which traps with a heavier carrier would sooner or later be destroyed. The fourth is in the construction of the upper trap C, which is formed of leather or its equivalents in lightness and strength, such as papier maché, vulcanized rubber, wood, &c. The fifth is the use of the annular opening $b$, which relieves the carrier from the returning atmospheric pressure when being discharged from the upper exit trap.

With the low air pressure and light carrier used in my apparatus, a metal trap of any kind is too heavy and cannot be properly opened by the impact of the carrier, thus rendering the use of the light trap as described, a very important matter. As at the cashier's end of the tube B, the carrier has the force of gravity to assist it to open the trap, the weight of the said trap is not so important.

It will be noticed that both the upper and lower outlet traps are provided with rubber seats $o$, while the upper inlet trap has a facing of leather, the purpose of which is to lessen the noise of the trap when closing.

I am aware that it is not new to provide an up-tube and a down-tube with openings on one side of each tube, and an air-chamber between said tubes, and therefore do not attempt to claim such construction; but regard my invention as essentially different therefrom. By constructing a chamber with the tubes passing therethrough and openings in all sides of said tubes to communicate with each other through said chamber, I provide an apparatus wherein the air is freely drawn into or out of said tubes in such a manner that when the carrier is passing by that portion of the tubes which is provided with openings, there will be no tendency for the air to attempt to hold the carrier, against the side with openings, to such an extent as to impede its progress, the pressure of the air being perfectly balanced on all sides.

From the above description, it will be readily understood that I have invented a cash carrier apparatus which will operate very effectively with a minimum air pressure.

What I claim as my invention is—

1. In a pneumatic cash carrier apparatus, the combination of a chamber, an up tube and a down tube connected to said chamber, and means for affording communication between one of said tubes and the outer air when the other tube is closed by the carrier, substantially as described.

2. In a pneumatic cash carrier apparatus, the up tube A, and down tube B, closed by the pivoted traps C, and D, in combination with the chamber E, communicating with the tubes A, and B, by the large openings $a$, and directly with the outer air by the opening $b$, when the trap C, is raised, substantially as and for the purpose specified.

3. In a pneumatic cash carrier apparatus, the combination with a delivery tube and an exit trap normally closing said delivery tube, of a hood M' located above said exit trap and arranged to deflect a carrier in its passage from said exit trap, substantially as described.

4. In a pneumatic cash carrier apparatus, the combination of a delivery tube, a pivoted trap closing the end of the same, a hood M' located above said trap and arranged to deflect a carrier in its passage out of said trap, and a buffer on said hood to receive the shock from the pivoted trap, substantially as described.

5. In a pneumatic cash carrier apparatus, the combination of the up tube A, having suitable communications with the down tube B, the pivoted leather trap C, located at the end of the tube A, and means as the opening b, forming when the trap C, is raised, a communication between the down tube B, and the outer air, substantially as and for the purpose specified.

6. In a pneumatic cash carrier apparatus, the down pipe B, closed by the pivoted spring-actuated trap G, in combination with the pivoted spring-actuated stop J, substantially as and for the purpose specified.

7. In a pneumatic cash carrier apparatus, the down pipe B, closed by the pivoted spring-actuated trap G, in combination with the pivoted spring-actuated stop J, the lug K, and stop L, substantially as and for the purpose specified.

8. The leather carrier F, comprising the following elements—the outer leather case $c'$, the inner leather case $d$, the stop $e$, and the opening $f$, substantially as and for the purpose specified.

9. The leather carrier F, comprising the following elements—the outer leather case $c'$, the inner leather case $d$, the stop $e$, the opening $f$, the flexible washer $g$, and soft head $h$, substantially as and for the purpose specified.

10. In a pneumatic cash carrier system, the combination of the carrier F, the up tube A, and the down tube B, having openings therein the pivoted traps C, and D, the chamber E, the openings $a$, and $b$, the pivoted spring actuated trap G, the lower end of the down pipe, the chamber H, means as the large openings $c$, for affording communication between one of said tubes and the outer air and suction pipe I, substantially as and for the purpose specified.

Toronto, January 10, 1894.

FREDERICK JAMES HAWORTH HAZARD.

In presence of—
A. M. NEFF,
FRED CLARKE.